Feb. 23, 1932.   J. H. MULLER   1,847,018
FRAUD PREVENTING DEVICE FOR GAS METERS
Filed March 11, 1929   2 Sheets-Sheet 2

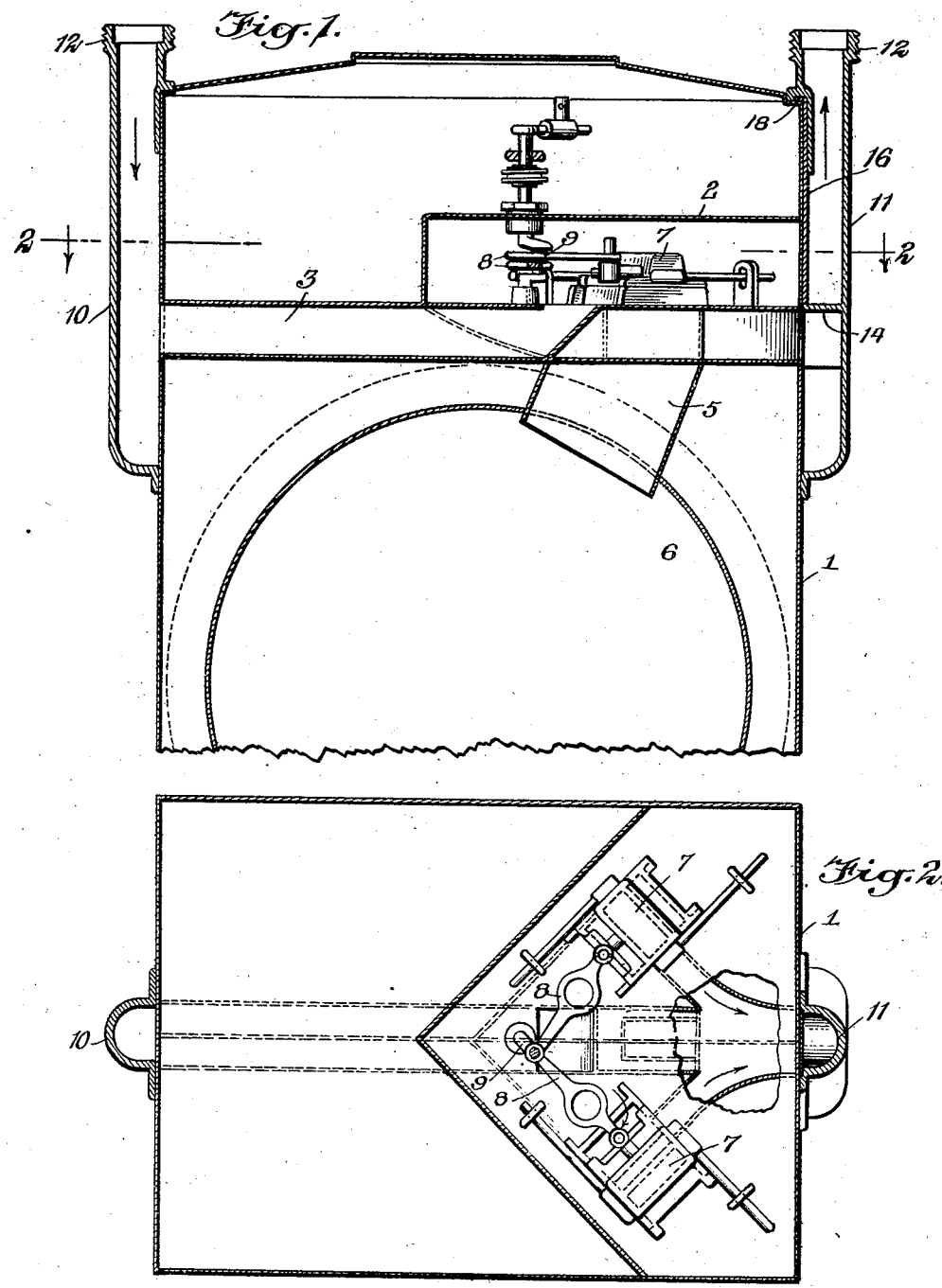

WITNESSES

INVENTOR
John H. Muller
BY
ATTORNEY

Patented Feb. 23, 1932

1,847,018

UNITED STATES PATENT OFFICE

JOHN H. MULLER, OF BROOKLYN, NEW YORK, ASSIGNOR TO THE CONSOLIDATED GAS COMPANY OF NEW YORK, OF NEW YORK, N. Y., A CORPORATION OF NEW YORK

FRAUD PREVENTING DEVICE FOR GAS METERS

Application filed March 11, 1929. Serial No. 346,238.

This invention relates to fraud preventing devices for gas meters.

An object of the invention is to provide the pipe coupling of a gas meter with a hardened steel or other suitable plate which prevents drilling, punching or otherwise forming an opening into the casing of the meter by an instrument inserted into the coupling.

A further object is to provide a plate of this character which can be used in connection with a standard type of coupling with but slight modification of the latter and which will most effectually prevent any perforation in the wall of the casing through fraudulent intent.

In cheating the gas company much ingenuity is employed by dishonest persons. One common means employed is to insert a wire into the outlet pipe and lift the valve so as to cause the gas to pass through the outlet without operating the indicating mechanism, and I prevent this by providing a baffle or deflector in the outlet coupling.

Another fraudulent method is to insert a drill or a sharp instrument in the outlet coupling and puncture the wall of the gas meter casing so as to cause the gas to leak into the outlet pipe without indicating, and it is this latter fraud which is the prime object of my invention to prevent.

I do not claim to be the first to employ a deflector or baffle in the coupling but only the same in combination with a plate of hard metal or other material which would answer the purpose and prevent the drilling or otherwise forming of a leak opening in the casing.

I use the terms "inlet" and "outlet pipe coupling" to indicate those parts of the gas meter which are attached to the meter and to which the gas supply and outlet pipes are coupled, although in the trade these parts are commonly known as flanged screws or meter pipes.

With these and other objects in view, the invention consists in certain novel features of construction and combinations and arrangements of parts, which will be more fully hereinafter described and pointed out in the claims.

In the accompanying drawings—

Figure 1 is a view in vertical section through a portion of a gas meter illustrating my invention;

Figure 2 is a sectional plan view on the line 2—2 of Figure 1, a portion being broken away to illustrate the parts beneath;

Figure 3:
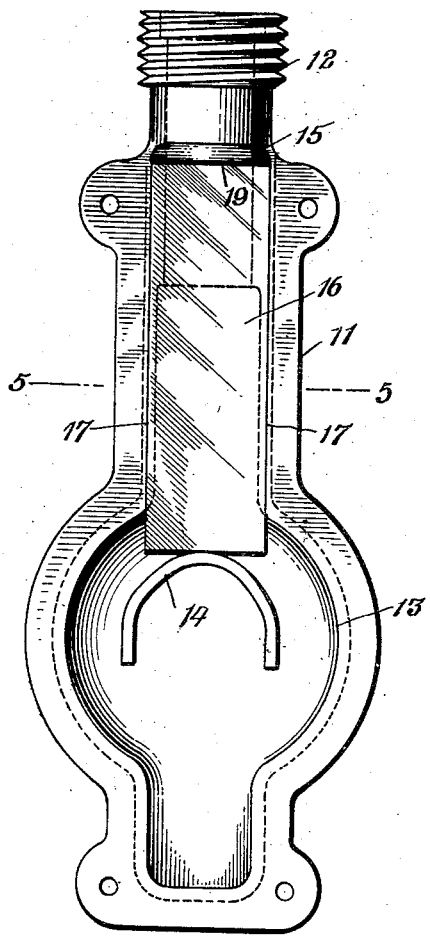
Figure 3 is an inner face view of my improved outlet coupling with my improved baffle plate in position thereon.
Figure 4:
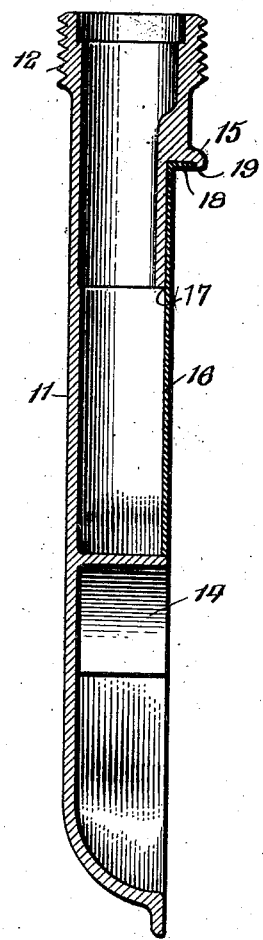
Figure 4 is a view in longitudinal section through the center of Figure 3.
Figure 5:
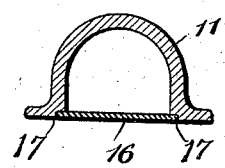
Figure 5 is a view in transverse section on the line 5—5 of Figure 3.

1 represents the casing of a gas meter, 2 a valve housing, 3 a gas inlet passage communicating with the valve housing and 5 a gas passage connecting one of the valves with a bellows 6.

My invention is not limited to any specific form of gas meter but I have illustrated a standard type of mechanism in order to more clearly illustrate my invention but I shall not describe such mechanism in detail except to say that valves 7 control the flow of gas to the bellows 6 and the valves are connected by links 8 to a crank shaft 9 operating the indicating mechanism, not shown.

10 represents an inlet coupling of standard make, and 11 is my improved outlet coupling. These couplings are secured to the sides of the casing 1 and extend above the casing and are screw-threaded at their upper ends, as shown at 12, for coupling engagement with gas line pipes.

My improved outlet coupling 11 is enlarged intermediate its ends, as shown at 13, and has a deflector 14 therein which is designed to prevent the entrance or passage of a wire down the outlet coupling 11 and under a valve 7, which is one of the fraudulent practices most commonly employed.

The inner face of the coupling 11 is flat so as to fit against the side of the casing 1, and a lip 15 is formed on the coupling which overlies the top of the casing 1.

16 represents my improved baffle plate which is made preferably of hardened steel although I do not wish to be limited to the particular material employed. This plate 16 fits in the recessed inner edges 17 of the coupling 11 and at its upper end has a laterally projecting and normally horizontal lip 18 which fits in a recess 19 in the lip 15 of coupling 11.

The plate 16 is preferably of a length to extend downwardly to a point against or adjacent the deflector 14 so that when the coupling is secured against the side of the casing 1 it is the plate 16 and its lip 18 which will prevent any possibility of a drill or sharp tool located within the coupling from drilling into the casing 1. In other words, it will be noted that my improved baffle plate 16 is countersunk in the inner face of the coupling 11 and not only acts to prevent an entrance of a drill or sharp tool into the side wall of the casing but the lip 15 will prevent the perforation of the casing at the upper corner thereof over which the coupling lies.

While I have illustrated what I believe to be a preferred embodiment of my invention it is obvious various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. The combination of a gas meter having an outlet pipe coupling secured thereto, of a hard metal plate located against the side of the meter and between the same and the oulet coupling, said plate protecting the meter casing from puncture, said outlet coupling having a lip extending over the top of the casing and the lip having a recess in its lower side, said plate having a lip located in said recess in said coupling lip.

2. The combination with a gas meter and an outlet coupling secured thereto, and having a recessed inner face of a hard metal plate countersunk in the recess in the inner face of the coupling and located against the side of the casing, and a deflector in said outlet coupling adjacent the lower end of said plate, said deflector being located above the outlet port of the casing and adapted to deflect an instrument inserted in the outlet from the exit from the wall of the meter.

JOHN H. MULLER.